United States Patent [19]

Wiegand et al.

[11] 4,318,335

[45] Mar. 9, 1982

[54] PRESSURE CONTROL VALVE

[75] Inventors: Hans-Jürgen Wiegand, Frankfurt-Sossenheim; Wolfgang Geiss, Steinbach, both of Fed. Rep. of Germany

[73] Assignee: ITT Industries, Inc., New York, N.Y.

[21] Appl. No.: 60,934

[22] Filed: Jul. 26, 1979

[30] Foreign Application Priority Data

Aug. 22, 1978 [DE] Fed. Rep. of Germany ....... 2836681

[51] Int. Cl.³ ............................ F15B 9/00; F16K 1/00
[52] U.S. Cl. ................................ 91/369 A; 251/324; 60/547 R; 403/143
[58] Field of Search ............ 60/547 R; 403/114, 115, 403/143, 122; 251/324; 137/316; 91/369 A

[56] References Cited

U.S. PATENT DOCUMENTS

| 985,013 | 2/1911 | Desmond | 403/143 |
| 3,385,616 | 5/1968 | Gottschald | 403/122 |
| 4,195,484 | 4/1980 | Mathues et al. | 60/547 R |

FOREIGN PATENT DOCUMENTS

| 1913518 | 10/1970 | Fed. Rep. of Germany | 60/547 |
| 2132629 | 1/1973 | Fed. Rep. of Germany | 60/547 |
| 979418 | 5/1961 | United Kingdom | 60/547 |
| 1379071 | 2/1975 | United Kingdom | . |

Primary Examiner—A. Michael Chambers
Attorney, Agent, or Firm—John T. O'Halloran; Alfred C. Hill

[57] ABSTRACT

Pressure control valves for mechanically controlled power brake units include a control casing with an approximately cylindrical guide member. The control casing houses a valve piston to which a piston rod extending through the guide member and projecting therefrom is secured. Prior to the mounting of the power brake unit, the piston rod may be subjected to lateral knocks which has to be absorbed by the control casing. Under increased knock impact, the result is frequently a damaged control casing. In accordance with the present invention this is overcome by arranging the piston rod shank which is adjacent to the end of the piston rod carried in the valve piston, at least partially within a bore of the valve piston and to dimension the radial distance between the bore and the piston rod shank such that the valve piston serves as a stop to limit the crosswise or radial movement of the piston rod.

23 Claims, 3 Drawing Figures

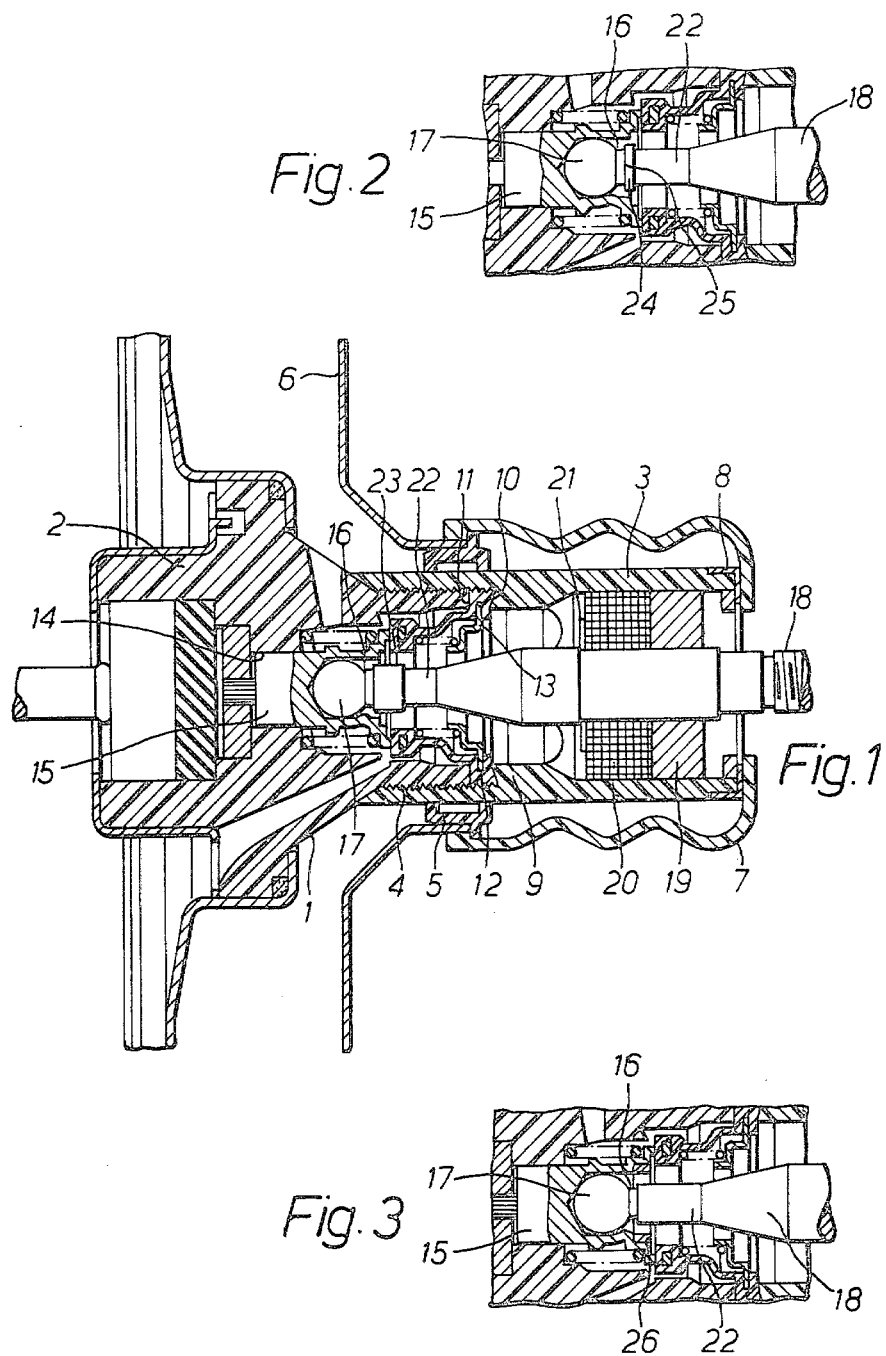

PRESSURE CONTROL VALVE

BACKGROUND OF THE INVENTION

This invention relates to a pressure control valve for a mechanically controlled power brake unit comprising essentially a control casing with at least an approximately cylindrical guide member extending out of the power brake unit, a valve closure member, a valve piston guided in the control casing, and a piston rod secured to the valve piston extending through the guide member and projecting therefrom, with the piston rod's one end being carried in a bore of the valve piston and being pivotable about that end.

From German Patent DE-OS No. 2,300,355 a power brake unit is known wherein the pressure control valve is arranged in a control casing. The control casing includes a guide member which is slidably carried in the vacuum casing. The front part of the control casing accommodates a valve piston and a valve closure member. Secured to the valve piston is a piston rod for the introduction of force, the rod extending through the guide member and projecting therefrom. In this arrangement, the piston rod has a spherical end carried in an opening of the valve piston.

The control casing is generally an inelastic plastic material which is well suited for injection molding techniques. Conventionally, an air filter enclosing the piston rod is arranged in the guide member. In addition to the air filter, a sound absorber may also be provided in the guide member.

Prior to the mounting of the power brake unit in an automotive vehicle, the piston rod is only carried on its spherical end and, consequently, pivotable about that end. The excursion of the piston rod is only limited by the edge of the guide member because the air filter and the sound absorber (if any) are highly elastic and, accordingly, exert no appreciable damping effect on the piston rod.

Before the power brake unit is mounted, for example, when in transit, the piston rod is subjected to lateral knocks which have to be taken up by the control casing. The guide member of the control casing is mostly thin-walled for reasons of weight and material and, accordingly, the degree of absorption of the lateral knocks acting on the piston rod is limited. Under increased knock impact, the control casing is frequently damaged. This is the case particularly with control casings consisting of two parts.

SUMMARY OF THE INVENTION

It is, therefore, an object of the present invention to provide a pressure control valve for a mechanically controlled power brake unit of the type referred to hereinabove wherein, in particular where a control casing consisting of two parts is used, the guide member is effectively protected against damage caused by lateral knocks acting on the piston rod in spite of a thin-walled construction.

A feature of the present invention is the provision of pressure control valve for a mechanically controlled power brake unit comprising a control casing having a front member and an approximately cylindrical guide member extending out of the power brake unit, a valve closure member secured between the front member and the guide member, a valve piston guided in the front member, and a piston rod having one end secured in a bore of the valve piston and the other end extending through and projecting from the guide member, the piston rod being pivotable about the one end, the piston rod having a shank portion adjacent the one end disposed at least partially in the bore, the radial distance between the bore and the shank being such that at least the valve piston serves as a stop to limit radial excursions of the piston rod.

In a suitable embodiment of the subject matter of the present invention, the portion of the piston rod shank lying within the bore has a radial collar. This arrangement has the advantage of limiting the radial distance between the piston rod and the valve piston without necessitating the insertion of an additional component.

In a preferred improvement of the present invention a ring is arranged on the piston rod shank within the bore. In an equivalent embodiment of the subject matter of the present invention, a ring secured to the valve piston is arranged close to the end of the bore. These arrangements permit limitation of the excursion of the piston rod to a greater or lesser extent depending on the outside or inside diameter of the ring without requiring an alteration of the piston rod itself. For ease of assembly of such a ring, it will be suitable to provide the ring with a slot extending in an axial or diagonal direction.

The ring is secured against axial displacement preferably by arranging it in a groove of the piston rod shank.

Preferably, the ring is made of a thermoplastic, semi-elastic material, with polyamides and polyurethanes being particularly suitable. Such materials afford the advantage of being able to receive the knock impact without the occurrence of permanent deformation.

BRIEF DESCRIPTION OF THE DRAWING

Above-mentioned and other features and objects of this invention will become more apparent by reference to the following description taken in conjunction with the accompanying drawing, in which:

FIG. 1 is a longitudinal cross sectional view of a pressure control valve of a power brake unit in accordance with the principles of the present invention.

FIG. 2 is a detail of FIG. 1 with a ring being arranged on the piston rod shank and FIG. 3 is a variant of FIG. 2 with a ring being secured in the bore of the valve piston.

DESCRIPTION OF THE PREFERRED EMBODIMENT

FIG. 1 shows a control casing 1 including a front member 2 and a guide member 3, front member 2 being connected with guide member 3 by means of a thread 4. Guide member 3 has a cylindrical circumferential surface and is slidably arranged in a slide seal 5 which is fastened in a vacuum casing 6. A bellow-type protecting cap 7 is secured to vacuum casing 6 on its one end and, on its other end, to the free end of guide member 3 by means of a holding device 8.

Guide member 3 is of tubular design and includes on the inside wall a projection 9 provided close to thread 4 and extending in an axial direction.

On its side facing thread 4, projection 9 has an approximately radial end surface 10 facing a radial end surface 11 of front member 2. Engaged between surfaces 10 and 11 is the outer edge of a poppet valve 12 including a spring plate 13.

A coaxial bore 14 of control casing 1 accommodates a valve piston 15 which includes, on the side adjacent to guide member 3, a bore 16 into which a spherical end 17 of a piston rod 18 engages which end is clamped therein by indentations. Piston rod 18 extends beyond the free end of guide member 3.

Arranged in guide member 3 close to its free end is a sound absorber 19 which encloses piston rod 18 and has an adjacent air filter 20 arranged towards front member 2. On the side of air filter 20 adjacent valve 12 is a washer 21 abutting against a step on piston rod 18 and preventing displacement of air filter 20 in the direction of valve 12.

Bore 16 of valve piston 15 is of such a depth that a piston rod shank 22 adjacent to spherical end 17 lies partially within bore 16. This part of piston rod shank 22 includes a radial collar 23, with the radial distance between collar 23 and valve piston 15 being so dimensioned that piston rod 18 is allowed to perform an excursion (crosswise or radial movement) in any direction by an angle of at least 3°, with the edge of valve piston 15 serving, however, as a stop for piston rod 18 when the excursion has reached its maximum permissible magnitude.

In FIG. 2, a ring 24 made of a thermoplastic, semi-elastic material is arranged on piston rod shank 22 in place of collar 23 and secured against longitudinal displacement. Ring 24 is provided with a diagonally extending slot 25 permitting easier fitting of ring 24 on shank 22. All other reference numerals correspond to those in FIG. 1.

FIG. 3 shows an arrangement wherein a ring 26 is secured in bore 16, the ring being made of metal or a semi-elastic plastic material. The inside diameter of ring 26 must be so dimensioned that piston rod 18 is in abutment with ring 26 when the excursion has reached its maximum permissible magnitude. All other reference numerals correspond to those in FIG. 1.

While we have described above the principles of our invention in connection with specific apparatus it is to be clearly understood that this description is made only by way of example and not as a limitation to the scope of our invention as set forth in the objects thereof and in the accompanying claims.

We claim:

1. A pressure control valve for a mechanically controlled power brake unit comprising:
    a control valve casing having a longitudinal axis disposed within and in an axially slidable, sealed relationship with a vacuum casing of said brake unit, said control valve casing including a front member coaxial of said axis disposed within said vacuum casing and an approximately cylindrical guide member connected to said front member in said vacuum casing and extending out of said vacuum casing coaxial of axis;
    a valve closure member secured between adjacent cooperating surfaces of said front member and said guide member coaxial of said axis within said control valve casing;
    a valve piston guided coaxial of said axis in a first axial bore disposed in said front member, said valve piston extending out of said first bore to a point adjacent said closure member, said valve piston having a second axial bore disposed therein having one end thereof open toward said closure member; and
    a piston rod coaxial of said axis having one end secured in said second bore and the other end extending through and projecting from said guide member, said piston rod being pivotable about said one end, said piston rod having a shank portion adjacent said one end disposed at least partially in said second bore and in a cooperative relationship with said open end of said second bore, the radial distance between said open end of said second bore and said shank portion being such that at least said valve piston adjacent said open end of said second bore serves as a stop to limit radial excursions of said piston rod.

2. A valve according to claim 1, wherein that part of said shank portion disposed in said second bore includes thereon a radial collar.

3. A valve according to claim 1, wherein that part of said shank portion disposed in said second bore includes thereon a ring.

4. A valve according to claim 3, wherein said ring is made of a thermplastic, semi-elastic material.

5. A valve according to claim 4, wherein said material is a polyamide.

6. A valve according to claim 4, wherein said material is polyurethane.

7. A valve according to claim 3, wherein said ring includes a slot therein to enable an easier fitting of said ring on said part of said shank portion.

8. A valve according to claim 7, wherein said ring is made of a thermoplastic, semi-elastic material.

9. A valve according to claim 8, wherein said material is a polyamide.

10. A valve according to claim 8, wherein said material is polyurethane.

11. A valve according to claim 3, wherein said ring is disposed in a groove in said part of said shank portion.

12. A valve according to claim 11, wherein said ring is made of a thermoplastic, semi-elastic material.

13. A valve according to claim 12, wherein said material is polyamide.

14. A valve according to claim 12, wherein said material is polyurethane.

15. A valve according to claim 11, wherein said ring includes a slot therein to enable an easier fitting of said ring in said groove.

16. A valve according to claim 15, wherein said ring is made of a thermoplastic, semi-elastic material.

17. A valve according to claim 16, wherein said material is polyamide.

18. A valve according to claim 16, wherein said material is polyurethane.

19. A valve according to claim 1, wherein a ring is secured to said valve piston adjacent said open end of said second bore, the inner diameter of said ring be such as to provide said stop.

20. A valve according to claim 19, wherein said ring is made of a metal.

21. A valve according to claim 19, wherein said ring is made of a thermoplastic, semi-elastic material.

22. A valve according to claim 21, wherein said material is polyamide.

23. A valve according to claim 21, wherein said material is polyurethane.

* * * * *